(12) United States Patent
Murakami et al.

(10) Patent No.: US 10,505,459 B2
(45) Date of Patent: Dec. 10, 2019

(54) POWER CONVERSION DEVICE

(71) Applicant: Mitsubishi Electric Corporation, Chiyoda-ku (JP)

(72) Inventors: Satoshi Murakami, Chiyoda-ku (JP); Yuta Komatsu, Chiyoda-ku (JP); Ryosuke Kobayashi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/347,990

(22) PCT Filed: Dec. 22, 2016

(86) PCT No.: PCT/JP2016/088327
§ 371 (c)(1),
(2) Date: May 7, 2019

(87) PCT Pub. No.: WO2018/116438
PCT Pub. Date: Jun. 28, 2018

(65) Prior Publication Data
US 2019/0319541 A1    Oct. 17, 2019

(51) Int. Cl.
H02M 3/335    (2006.01)
H02M 1/42     (2007.01)
H02M 7/12     (2006.01)
H02M 1/00     (2006.01)

(52) U.S. Cl.
CPC ..... *H02M 3/33507* (2013.01); *H02M 1/4208* (2013.01); *H02M 7/12* (2013.01); *H02M 2001/0012* (2013.01)

(58) Field of Classification Search
CPC .. H02M 3/33507; H02M 1/4208; H02M 7/12; H02M 2001/0012
See application file for complete search history.

(56) References Cited

U.S. PATENT DOCUMENTS

2009/0180305 A1    7/2009    Hashino et al.
2010/0320994 A1    12/2010   Hashino et al.
2014/0292455 A1*   10/2014   Kurita ................. H01F 3/14
                                                       336/5

FOREIGN PATENT DOCUMENTS

JP    5144284 B2    2/2013
JP    5210331 B2    6/2013

OTHER PUBLICATIONS

International Search Report dated Feb. 28, 2017 in PCT/JP2016/088327 filed on Dec. 22, 2016.

* cited by examiner

*Primary Examiner* — Adolf D Berhane
*Assistant Examiner* — Afework S Demisse
(74) *Attorney, Agent, or Firm* — Oblon, McClelland, Maier & Neustadt, L.L.P.

(57) ABSTRACT

A power conversion device including: a reactor formed such that a DC winding and a plurality of coupled windings are wound around one magnetic body, one end of the DC winding is connected to a voltage source, one end of each of the plurality of coupled windings is connected to another end of the DC winding, another end of each of the plurality of coupled windings is connected to each intermediate connection point between a plurality of upper and lower arms composed of switching elements, and a control device for controlling the switching elements, wherein switching of the upper arms or the lower arms is controlled in accordance with a magnitude of a duty of the switching operation and a magnitude relationship between DC current ripple and AC current ripple composing current ripple in the coupled windings.

13 Claims, 12 Drawing Sheets

POWER CONVERSION DEVICE

TECHNICAL FIELD

The present invention relates to a power conversion device that performs conversion between DC voltage and DC voltage or between AC voltage and DC voltage.

BACKGROUND ART

As a conventional power converter, for example, in a circuit configuration for bridge-less power factor correction (PFC), there is known a configuration in which current of legs for which switching is performed is distributed as two currents, a reactor is provided to each leg, and interleave operation is performed (see, for example, Patent Document 1). In addition, in a magnetism integrated circuit configuration, a circuit configuration that causes DC magnetic fluxes to cancel out each other is known (see, for example, Patent Document 2).

CITATION LIST

Patent Document

Patent Document 1: Japanese Patent No. 5210331
Patent Document 2: Japanese Patent No. 5144284

SUMMARY OF THE INVENTION

Problems to be Solved by the Invention

In a switching power supply device of the power converter shown in Patent Document 1, legs for which switching is performed are provided for N phases, and switching is performed with the phases shifted by 360/N degrees, whereby, owing to a current dividing function, loss can be reduced and input/output current ripple can be reduced. However, downsizing by integrating the reactors provided for N phases, and reduction of ripple current flowing through a winding of the integrated reactor, are not disclosed at all. In Patent Document 2 which discloses magnetic circuit integration, windings of a core are wound in such directions that DC magnetic fluxes cancel out each other. Therefore, while magnetic flux saturation by DC magnetic fluxes can be prevented, there is a problem that a DC inductance can be formed only by a leakage magnetic flux. The present invention has been made to solve such problems, and an object of the present invention is to provide a power conversion device in which a plurality of reactors are magnetically integrated to one core, current ripple can be suppressed, and a power supply filter can be downsized.

Solution to the Problems

A power conversion device according to the present invention includes: a reactor formed such that a DC winding and a plurality of coupled windings are wound around one magnetic body, one end of the DC winding is connected to a voltage source, one end of each of the plurality of coupled windings is connected to another end of the DC winding, another end of each of the plurality of coupled windings is connected to each intermediate connection point between a plurality of upper and lower arms composed of switching elements, and magnetic fluxes generated by currents flowing through the DC winding and the coupled windings merge with each other in the same direction; and a control device for controlling the switching elements, wherein the upper and lower arms arranged in parallel are caused to perform switching operation so as to be shifted by 180 degrees from each other, and switching of the upper arms or the lower arms is controlled in accordance with a magnitude of a duty of the switching operation and a magnitude relationship between DC current ripple and AC current ripple composing current ripple in the coupled windings.

Effect of the Invention

In the power conversion device according to the present invention, switching control is performed in accordance with the magnitude relationship between DC current ripple and AC current ripple in the coupled windings, whereby loss in the coupled windings can be suppressed.

DESCRIPTION OF EMBODIMENTS

Embodiment 1

Figure 1:
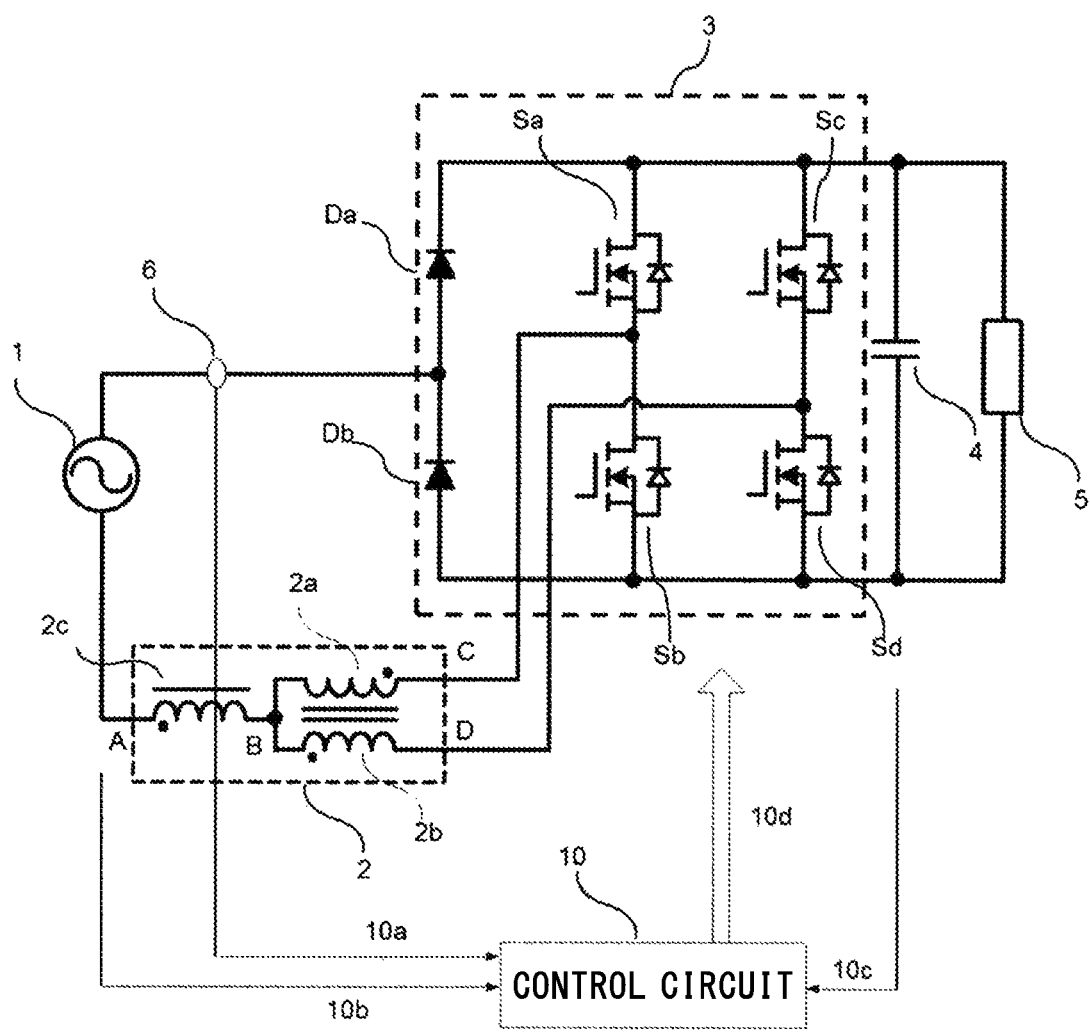
FIG. 1 is a circuit configuration diagram of a power conversion device according to embodiment 1 of the present invention.
Figure 2:
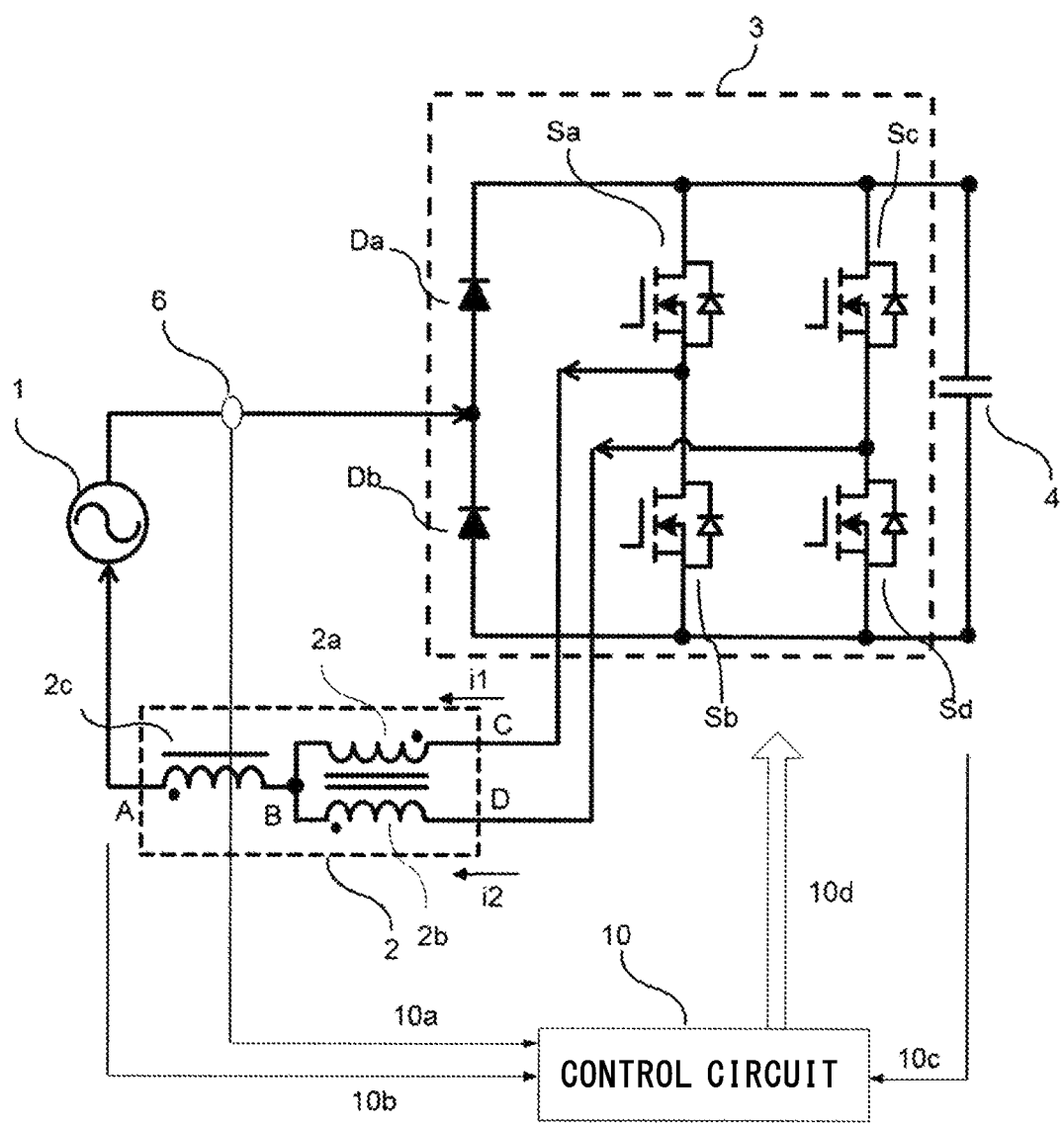
FIG. 2 illustrates a current route in the case of positive polarity in the circuit in FIG. 1.
Figure 3:
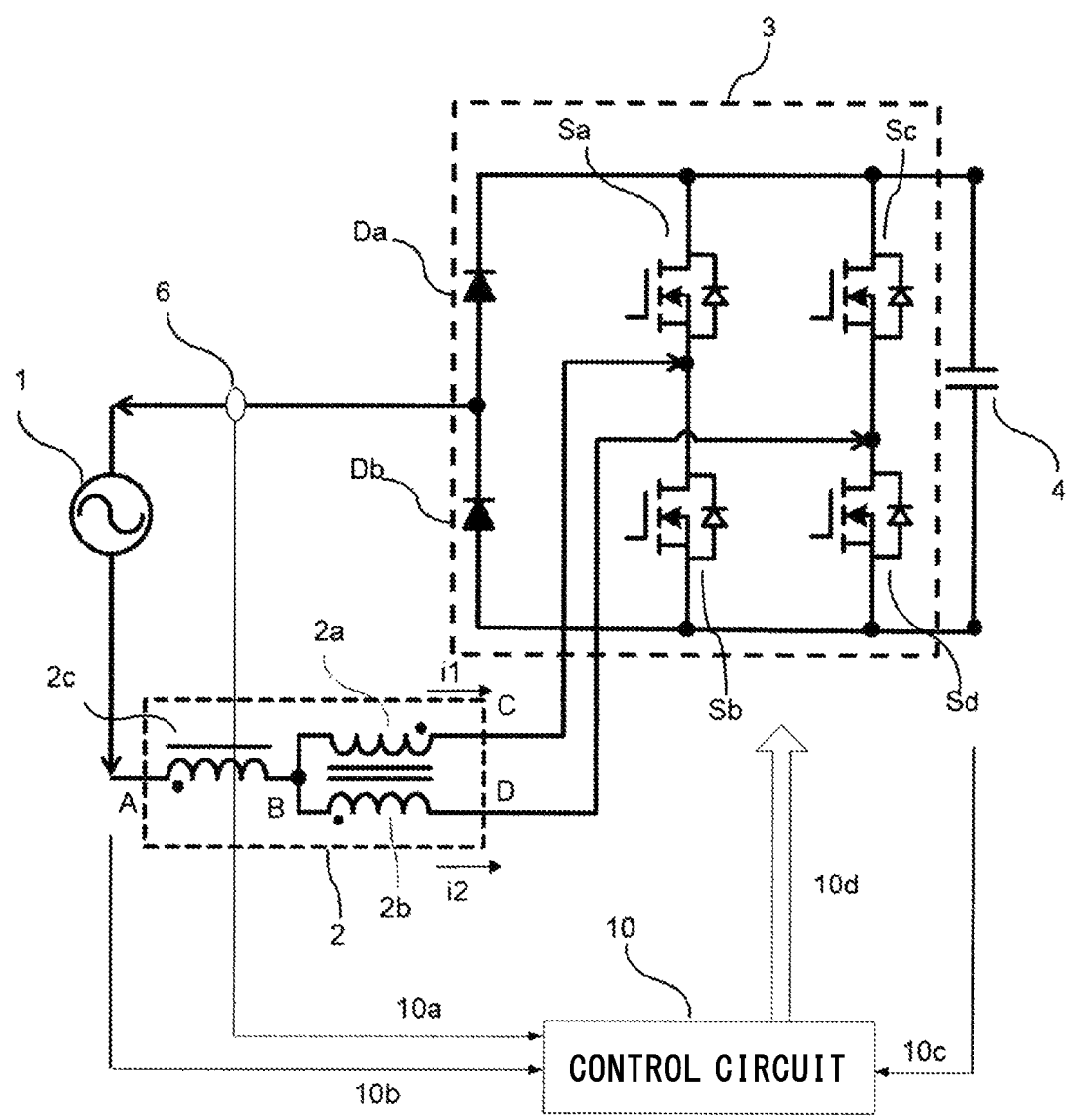
FIG. 3 illustrates a current route in the case of negative polarity in the circuit in FIG. 1.

FIG. 1 shows a circuit configuration of a power conversion device according to embodiment 1 of the present invention, FIG. 2 shows a current route in the case of positive polarity in the circuit shown in FIG. 1, and FIG. 3 schematically illustrates a current route in the case of negative polarity in the circuit shown in FIG. 1.

As shown in FIG. 1, one end of an AC voltage source 1 is connected to one end of a third winding 2c composing an integrated magnetic part 2 (point A), and another end of the third winding 2c is connected to a point (point B) at which a first winding 2a and a second winding 2b are connected. The first winding 2a and the second winding 2b are each connected between upper and lower arms in a converter circuit 3 (point C, point D), and output of the converter circuit 3 is connected to a load 5 via a link capacitor 4.

Another end of the AC voltage source 1 is connected to the middle point between rectification elements Da, Db connected in series in the converter circuit 3, the cathode of the rectification element Da is connected to the positive terminal of the link capacitor 4, and the anode of the rectification element Db is connected to the negative terminal of the link capacitor 4.

A control circuit 10 generates a drive signal 10d for driving the converter circuit 3, on the basis of input current information 10a from a current sensor 6, input voltage information 10b from the AC voltage source 1, and voltage information 10c about the link capacitor 4 which corresponds to output voltage, thereby performing control so as to achieve target output voltage and performing control so as to achieve high power factor operation in which the AC voltage phase and the AC current phase are synchronized with each other.

Figure 13:
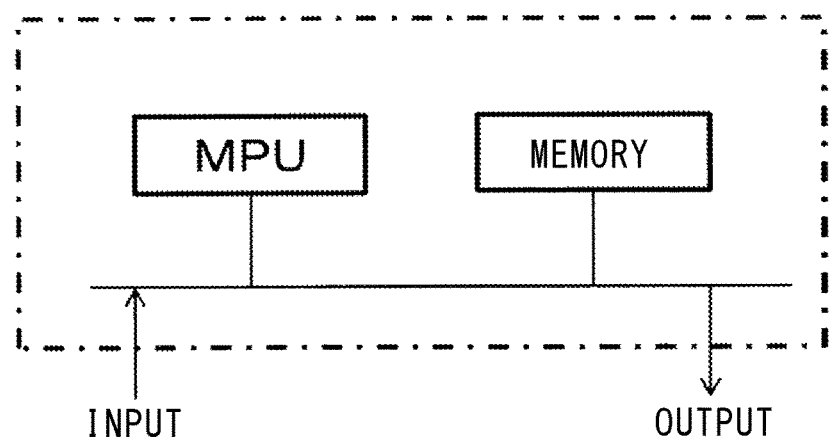
FIG. 13 is a hardware configuration diagram of a control circuit according to embodiments 1 to 4 of the present invention.

As shown in FIG. 13, the control circuit 10 may be implemented by combination of a processor (MPU) and a computer program stored in a memory, may be implemented by dedicated hardware such as ASIC, may be implemented by a reconfigurable gate array such as FPGA, or may be implemented by combination of these.

FIG. 2 shows a current route (arrows in the drawing) in the case where the AC input voltage is positive in the power converter circuit in embodiment 1 shown in FIG. 1.

Current from the AC voltage source 1 flows through the rectification element Da and then the link capacitor 4 in the converter circuit 3, and then is divided to switching elements Sb, Sd which are turned on in the converter circuit 3. Then, the currents are merged at the integrated magnetic part 2, and the current returns to the AC voltage source 1. At this time, switching elements Sa, Sc in the converter circuit 3 are caused to perform switching operations, thereby exciting the integrated magnetic part 2 and stepping up the voltage of the AC voltage source 1.

FIG. 3 shows a current route (arrows in the drawing) in the case where the AC input voltage is negative in the power converter circuit in embodiment 1 shown in FIG. 1.

Current from the AC voltage source 1 flows into the integrated magnetic part 2 and then is divided to the switching elements Sa, Sc which are turned on in the converter circuit 3. Then, the current flows into the link capacitor 4, passes through the rectification element Db in the converter circuit 3, and then returns to the AC voltage source 1. At this time, the switching elements Sb, Sd in the converter circuit 3 are caused to perform switching operations with their phases shifted by 180 degrees, thereby exciting the integrated magnetic part 2 and stepping up the voltage of the AC voltage source 1.

Next, the configuration of the integrated magnetic part 2 described above will be described, and expressions of a DC inductance and an AC inductance of the integrated magnetic part 2 and an expression of current ripple will be shown. In the following description, control for the switching elements Sb, Sd composing the lower arms will be described using the example of the current route in the case of negative polarity shown in FIG. 3. The same operations and effects are provided by controlling the switching elements Sa, Sc in the current route in the case of positive polarity shown in FIG. 2.

Figure 4A:
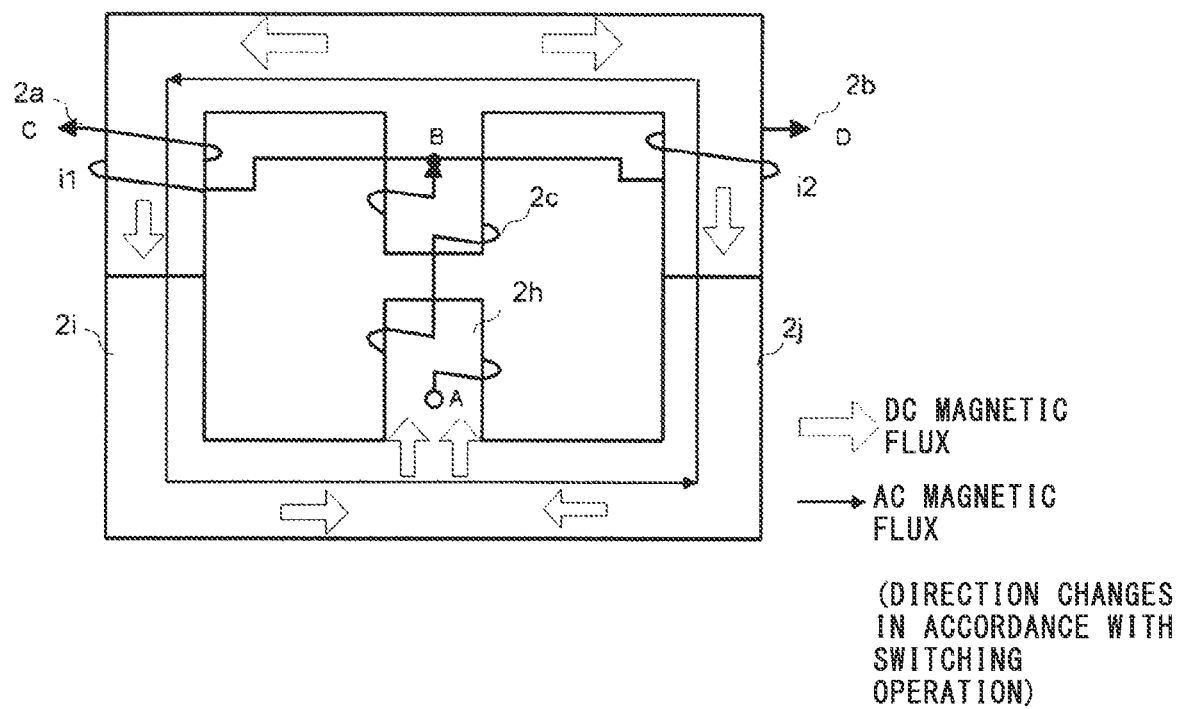
FIG. 4A is a schematic diagram showing, by a magnetic resistor network, an integrated magnetic part in embodiment 1 of the present invention.
Figure 4B:
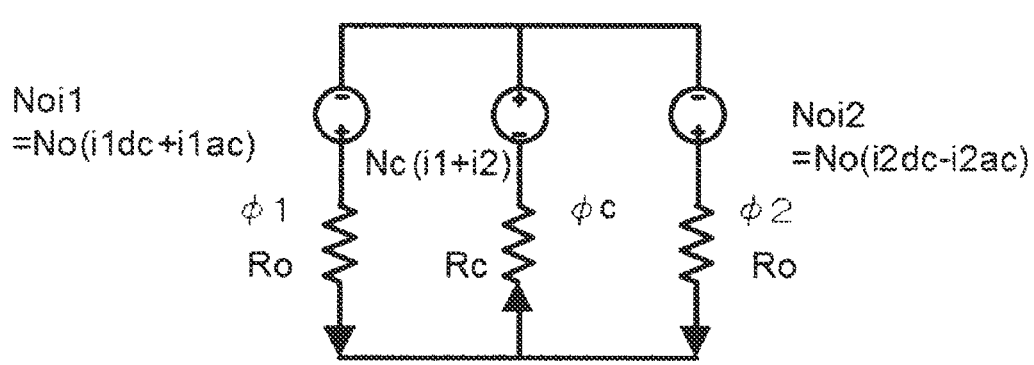
FIG. 4B is a magnetic equivalent circuit diagram corresponding to FIG. 4A.

FIG. 4A is a schematic diagram showing, by a magnetic resistor network, the integrated magnetic part 2 in embodiment 1, and FIG. 4B shows a magnetic equivalent circuit corresponding to FIG. 4A. The meanings of the symbols in the drawings are as follows.

No: number of turns of first winding 2a, second winding 2b

Nc: number of turns of third winding 2c ic: current of third winding 2c i1: current of first winding 2a i2: current of second winding 2b Ro: magnetic resistance of first side leg 2i, second side leg 2j of core Rc: magnetic resistance of center leg 2h of core $\varphi 1$: magnetic flux of first side leg 2i of core $\varphi 2$: magnetic flux of second side leg 2j of core $\varphi c$: magnetic flux of center leg 2h of core In FIG. 4A, the core of the integrated magnetic part 2 has, for example, a shape having three legs, such as EE type or EI type. The first winding 2a is wound around a first side leg 2i of the core and the second winding 2b is wound around a second side leg 2j of the core such that DC magnetic fluxes are cancelled out by each other, thereby forming a coupled reactor. The third winding 2c is wound around a center leg 2h of the core in such a direction as to strengthen with the magnetic fluxes of the first winding 2a and the second winding 2b, thereby forming a DC reactor. A gap for preventing DC magnetic flux saturation is provided in the center leg 2h of the core. The gap may be configured such that the coupling degree of the coupled reactor and the coupling degree between the coupled reactor and the DC reactor are also adjusted and an AC magnetic flux leaked from the gap is canceled out.

DC magnetic fluxes are generated so as to merge at the center leg 2h of the core, and the directions thereof do not change unless the power transmission direction is changed. On the other hand, AC magnetic fluxes circulate through the side legs 2i, 2j of the core while the directions thereof change every time the switching elements Sb, Sd perform switching. In the center leg 2h of the core, the circulating AC magnetic fluxes always have opposite directions and thus are canceled out by each other.

Next, it will be described that the inductance of the integrated magnetic part 2 is composed of a self-inductance, a mutual inductance, and a leakage inductance.

Magnetic fluxes 91, 92, 9c generated in the windings are represented by (Expression 1) from the relationship of the magnetomotive force of the core of each of the side legs 2i, 2j and the center leg 2h of the core.

[Mathematical 1]

$$\begin{pmatrix} \phi 1 \\ \phi 2 \\ \phi c \end{pmatrix} = \begin{pmatrix} \dfrac{R_O+R_C}{R_O^2+2R_O\times R_C} & \dfrac{-R_C}{R_O^2+2R_O\times R_C} & \dfrac{R_O}{R_O^2+2R_O\times R_C} \\ \dfrac{-R_C}{R_O^2+2R_O\times R_C} & \dfrac{R_O+R_C}{R_O^2+2R_O\times R_C} & \dfrac{R_O}{R_O^2+2R_O\times R_C} \\ \dfrac{R_O}{R_O^2+2R_O\times R_C} & \dfrac{R_O}{R_O^2+2R_O\times R_C} & \dfrac{2R_O}{R_O^2+2R_O\times R_C} \end{pmatrix} \begin{pmatrix} N_O\times i_1 \\ N_O\times i_2 \\ N_C\times i_c \end{pmatrix} \quad \text{(Expression 1)}$$

Where voltage generated in the first winding 2a is V1, voltage generated in the second winding 2b is V2, and voltage generated in the third winding 2c is Vc, V1=Nodφ1/dt, V2=Nodφ2/dt, and Vc=Ncdφc/dt are satisfied.

Using these, if (Expression 1) is deformed, V1, V2, and Vc are represented by (Expression 2) and (Expression 3).

[Mathematical 2]

$$\begin{pmatrix} V1 \\ V2 \\ Vc \end{pmatrix} = A \begin{pmatrix} \dfrac{d}{dt}i_1 \\ \dfrac{d}{dt}i_2 \\ \dfrac{d}{dt}i_c \end{pmatrix} \quad \text{(Expression 2)}$$

[Mathematical 3]

$$A = \begin{pmatrix} N_O^2 \dfrac{R_O+R_C}{R_O^2+2R_O\times R_C} & N_O^2 \dfrac{-R_C}{R_O^2+2R_O\times R_C} & N_O N_C \dfrac{R_O}{R_O^2+2R_O\times R_C} \\ N_O^2 \dfrac{-R_C}{R_O^2+2R_O\times R_C} & N_O^2 \dfrac{R_O+R_C}{R_O^2+2R_O\times R_C} & N_O N_C \dfrac{R_O}{R_O^2+2R_O\times R_C} \\ N_O N_C \dfrac{R_O}{R_O^2+2R_O\times R_C} & N_O N_C \dfrac{R_O}{R_O^2+2R_O\times R_C} & N_C^2 \dfrac{2R_O}{R_O^2+2R_O\times R_C} \end{pmatrix} \quad \text{(Expression 3)}$$

The first winding 2a and the second winding 2b, and the first side leg 2i and the second side leg 2j of the core, are symmetric.

Therefore, where the self-inductance of each of the first side leg 2i and the second side leg 2j is Lo, the self-inductance of the center leg 2h is Lc, the mutual inductance of the first side leg 2i and the second side leg 2j is Mo, and the mutual inductance between the center leg 2h, and the first side leg 2i and the second side leg 2j, is Mc, (Expression 2) can be represented by (Expression 4).

[Mathematical 4]

$$\begin{pmatrix} V1 \\ V2 \\ Vc \end{pmatrix} = \begin{pmatrix} L_O & -M_O & M_C \\ -M_O & L_O & M_C \\ M_C & M_C & L_C \end{pmatrix} \begin{pmatrix} \dfrac{d}{dt}i_1 \\ \dfrac{d}{dt}i_2 \\ \dfrac{d}{dt}i_c \end{pmatrix} \quad \text{(Expression 4)}$$

From is =i1+i2, (Expression 4) can be deformed to obtain (Expression 5).

[Mathematical 5]

$$\begin{pmatrix} V1 \\ V2 \\ Vc \end{pmatrix} = \begin{pmatrix} L_O+M_C & -M_O+M_C \\ -M_O+M_C & L_O+M_C \\ M_C+M_C & L_C+M_C \end{pmatrix} \begin{pmatrix} \dfrac{d}{dt}i_1 \\ \dfrac{d}{dt}i_2 \end{pmatrix} \quad \text{(Expression 5)}$$

From comparison between (Expression 2), (Expression 3), and (Expression 4), Lo, Lc, Mo, and Mc are respectively represented by (Expression 6) to (Expression 9) below.

[Mathematical 6]

$$L_O = N_O^2 \dfrac{R_O+R_C}{R_O^2+2R_O\times R_C} \quad \text{(Expression 6)}$$

[Mathematical 7]

$$L_C = N_C^2 \dfrac{2R_O}{R_O^2+2R_O\times R_C} \quad \text{(Expression 7)}$$

[Mathematical 8]

$$M_O = N_O^2 \dfrac{R_C}{R_O^2+2R_O\times R_C} \quad \text{(Expression 8)}$$

[Mathematical 9]

$$M_C = N_O N_C \dfrac{R_O}{R_O^2+2R_O\times R_C} \quad \text{(Expression 9)}$$

Where the coupling degree between the first winding 2a and the second winding 2b is ko, and the coupling degree between the first winding 2a, and the second winding 2b and the third winding 2c, is kc, ko and kc are respectively represented by (Expression 10) and (Expression 11).
[Mathematical 10]

$$k_O = \frac{M_O}{\sqrt{L_O L_O}} = \frac{R_C}{R_O + R_C} \quad \text{(Expression 10)}$$

[Mathematical 11]

$$k_C = \frac{M_C}{\sqrt{L_O L_C}} = \frac{R_O}{\sqrt{2R_O(R_O + R_C)}} \quad \text{(Expression 11)}$$

Where voltage between the third winding 2c and the first winding 2a is V1$_e$(A-C) and voltage between the third winding 2c and the second winding 2b is V2e(A-D), these are respectively represented by (Expression 12) and (Expression 13).
[Mathematical 12]

$$V_{1e} = V1 + Vc \quad \text{(Expression 12)}$$

[Mathematical 13]

$$V_{2e} = V2 + Vc \quad \text{(Expression 13)}$$

From the above (Expression 12) and (Expression 13), using Vin as input voltage and Vout as output voltage, the following are obtained.

For example, in the current route shown in FIG. 3, in the case where the switching element Sb connected to the winding is turned on and the switching element Sd connected to the winding is turned off, V1e=Vin and V2e=Vin−Vout are satisfied.

In the case where the switching element Sd connected to the winding is turned on and the switching element Sb connected to the winding is turned off, V1e=Vin−Vout and V2e=Vin are satisfied.

In the case where the switching element Sb connected to the winding is turned off and the switching element Sd connected to the winding is turned off, V1e=Vin−Vout and V2e=Vin−Vout are satisfied.

In the case where the switching element Sb connected to the winding is turned on and the switching element Sd connected to the winding is turned on, V1e=Vin and V2e=Vin are satisfied.

If (Expression 5) is substituted into (Expression 12) and (Expression 13), V1e and V2e are represented by (Expression 14).
[Mathematical 14]

$$\begin{pmatrix} V_{1e} \\ V_{2e} \end{pmatrix} = \begin{pmatrix} L_O + L_C + 2M_C & L_C - M_O + 2M_C \\ L_C - M_O + 2M_C & L_O + L_C + 2M_C \end{pmatrix} \begin{pmatrix} \frac{d}{dt} i_1 \\ \frac{d}{dt} i_2 \end{pmatrix} \quad \text{(Expression 14)}$$

Currents i1, i2 are represented using a DC component idc and an AC component iac as shown by (Expression 15).
[Mathematical 15]

$$\frac{d}{dt} i_1 = \frac{d}{dt} i_{dc} + \frac{d}{dt} i_{ac} \quad \text{(Expression 15)}$$

-continued $$\frac{d}{dt} i_2 = \frac{d}{dt} i_{dc} - \frac{d}{dt} i_{ac}$$

From (Expression 14) and (Expression 15), the DC component and the AC component of the above currents are represented by (Expression 16) and (Expression 17).
[Mathematical 16]

$$\frac{d}{dt} i_{dc} = \frac{1}{2}\left(\frac{d}{dt} i_1 + \frac{d}{dt} i_2\right) = \frac{1}{(2L_C + 4M_C + L_O - M_O)} \times \frac{(V_{1e} + V_{2e})}{2} \quad \text{(Expression 16)}$$

[Mathematical 17]

$$\frac{d}{dt} i_{ac} = \frac{1}{2}\left(\frac{d}{dt} i_1 - \frac{d}{dt} i_2\right) = \frac{1}{(L_O + M_O)} \times \frac{(V_{1e} - V_{2e})}{2} \quad \text{(Expression 17)}$$

In (Expression 16) and (Expression 17), regarding the following values:
[Mathematical 18]

$$\frac{d}{dt} i_{dc}, \frac{d}{dt} i_{ac},$$

these values are represented by (Expression 18) and (Expression 19), using (Expression 6) to (Expression 9).
[Mathematical 19]

$$\frac{d}{dt} i_{dc} = \quad \text{(Expression 18)}$$
$$\frac{1}{2}\left(\frac{d}{dt} i_1 + \frac{d}{dt} i_2\right) = \frac{R_O + 2R_C}{(N_O^2 + 4N_C^2 + 4N_O N_C)} \times \frac{(V_{1e} + V_{2e})}{2}$$

[Mathematical 20]

$$\frac{d}{dt} i_{ac} = \frac{1}{2}\left(\frac{d}{dt} i_1 - \frac{d}{dt} i_2\right) = \frac{R_O}{N_O^2} \times \frac{(V_{1e} - V_{2e})}{2} \quad \text{(Expression 19)}$$

In general, where the permeability is μ, the core sectional area is Ae, and the circumferential length of the core is 1, the relationship between a magnetic resistance R and the permeability μ of a core is an inverse proportional relationship as shown by (Expression 20).
[Mathematical 21]

$$R = \frac{1}{\mu A e} \quad \text{(Expression 20)}$$

Figure 5:
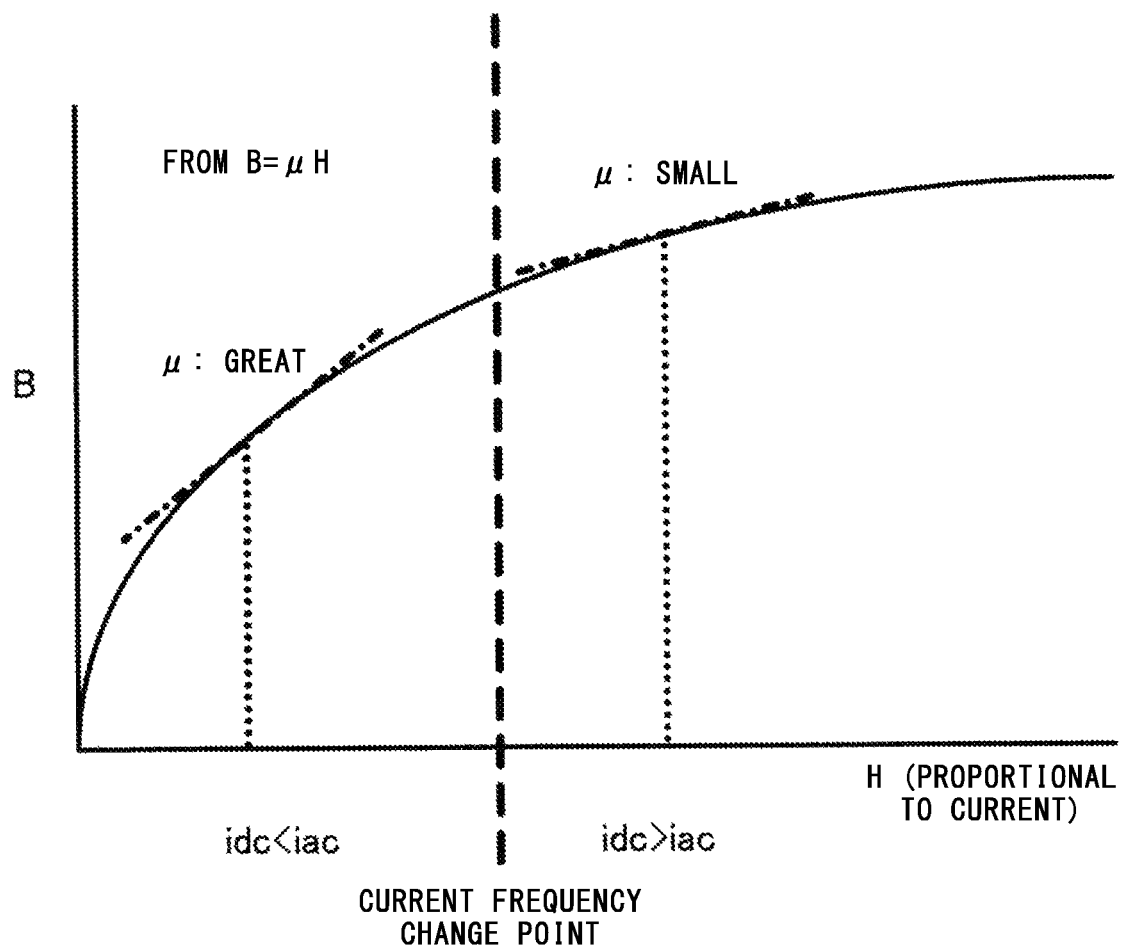
FIG. 5 illustrates nonlinearity of BH characteristic of a core material in embodiment 1 of the present invention.

In the case where the BH characteristic of the core material is nonlinear as shown in FIG. 5, if the permeability p decreases due to increase in current, the magnetic resistance R increases, so that the DC current ripple idc and the AC current ripple iac represented by (Expression 18) and (Expression 19) increase.

In the case of Rc≫Ro as in a structure in which a gap is provided in the center leg 2h, the amount of increase in the current ripple with respect to increase in the current is greater for the AC current ripple iac than for the DC current ripple idc, and thus it is shown that, for example, even if DC current ripple idc>AC current ripple iac is satisfied where the current is small, DC current ripple idc<AC current ripple iac may be satisfied where the current is great.

Where the DC inductance is Ldc and the AC inductance is Lac, from (Expression 18) and (Expression 19), Ldc and Lac are respectively represented by (Expression 21) and (Expression 22).

[Mathematical 22]

$$L_{dc} = 2L_C + 4M_C + L_O - M_O = \frac{N_O^2 + 4N_C^2 + 4N_O N_C}{R_O + 2R_C} \quad \text{(Expression 21)}$$

[Mathematical 23]

$$L_{ac} = L_O + M_O = \frac{N_O^2}{R_O} \quad \text{(Expression 22)}$$

The current ripple can be calculated by substituting the magnetic resistance determined by the core shape and the winding current, the voltage relationship between input and output, and the switching time into (Expression 18) and (Expression 19).

Next, focusing on the inductances, in the DC inductance of (Expression 21), the leakage inductance Lo−Mo of the first winding 2a and the second winding 2b forming the coupled reactor, and the mutual inductance 4Mc between the third winding 2c and the first winding 2a and between the third winding 2c and the second winding 2b, are added to the self-inductance 2Lc of the third winding 2c. Thus, it is found that, owing to magnetic integration, a higher inductance is obtained as compared to a separate-body configuration, and the DC inductance can be adjusted by the number of winding turns and the coupling degree.

As described above, in the integrated magnetic part 2 of embodiment 1 of the present invention, the DC inductance can be formed using, in addition to the self-inductance of the third winding 2c forming the DC reactor, the mutual inductance with each of the first winding 2a and the second winding 2b of the AC reactor, and the leakage inductance of the coupled reactor. Therefore, a reactor having a small size and having a high inductance can be obtained.

Further, in the case where the core has a shape having three legs such as EE type or EI type, a leakage magnetic flux does not occur in the gap of the center leg 2h, and thus the inductance and the leakage inductance can be formed without occurrence of eddy current loss in the third winding 2c wound around the center leg 2h, whereby a function as a filter for the power supply can be assigned.

Hereinafter, reduction of current ripple by using the integrated magnetic part 2 described above will be described in relation to control for the switching elements.

Figure 6:
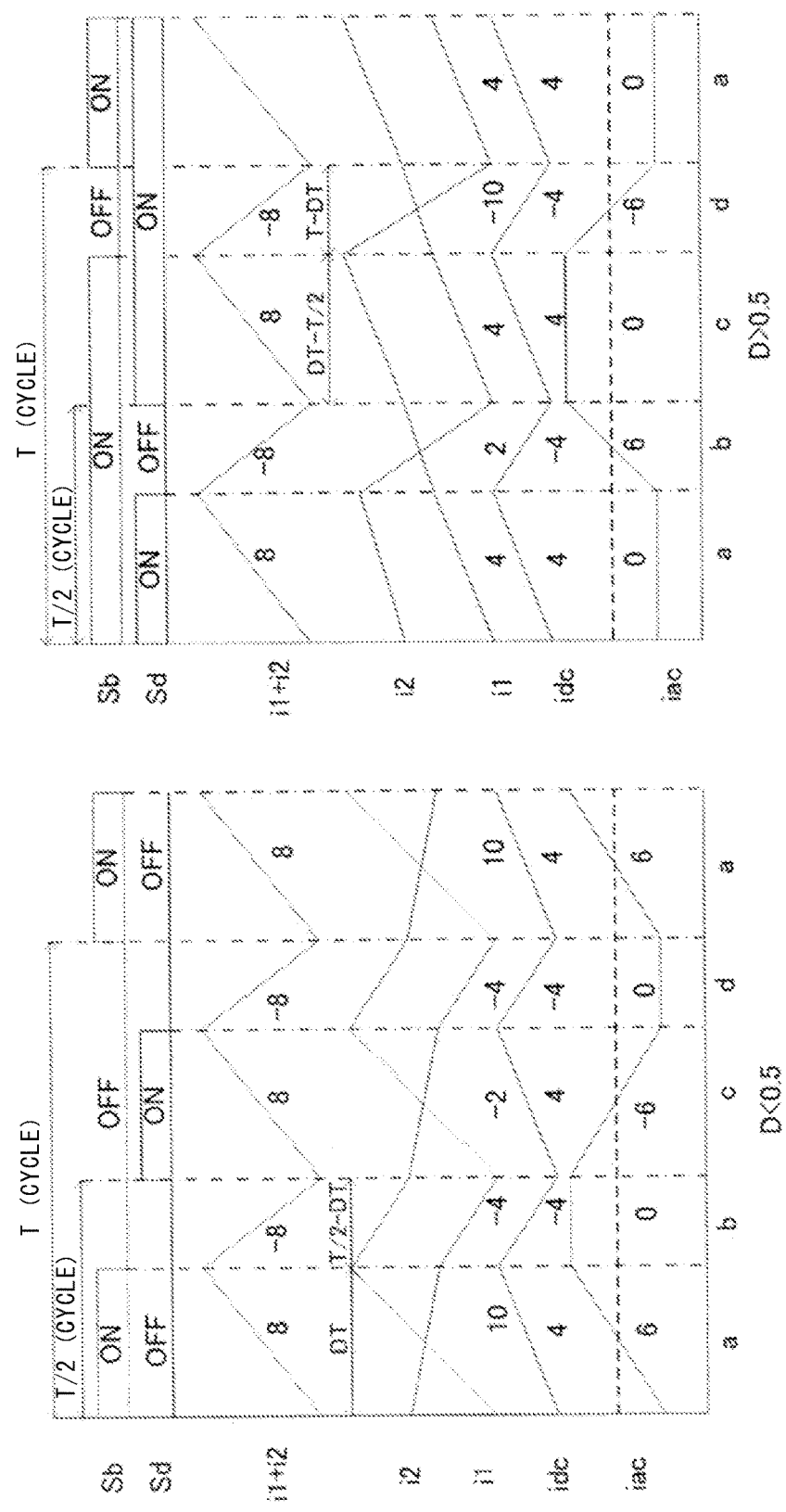
FIG. 6 schematically illustrates occurrence of current ripple in the case of the negative current route shown in FIG. 3.

First, in FIG. 6, an example of occurrence of current ripple during driving of the switching elements will be schematically described. FIG. 6 illustrates current it (current ripple) of the first winding 2a in the case of the negative current route shown in FIG. 3, while separating the current ripple into the DC current ripple idc and the AC current ripple iac. FIG. 6(1) shows the case of D (duty)<0.5, and FIG. 6(2) shows the case of D>0.5.

FIG. 6 shows an example in which the DC current ripple contained in the current ripple of the coupled winding is smaller than the AC current ripple (idc<iac). The duty D is the ratio of an ON time to a cycle T.

As operation modes, four modes of a state (a), a state (b), a state (c), and a state (d) are repeatedly executed in accordance with the operation states of the switching elements Sb, Sd. It is noted that the switching elements Sa, Sc respectively operate for synchronous rectification complementarily with respect to the switching elements Sb, Sd.

(1) Case of D<0.5

In the state (a), the switching element Sb is ON and the switching element Sd is OFF, and a current loop is formed in which current flows from the AC voltage source 1 through the third winding 2c, the first winding 2a, the switching element Sb, and then the rectification element Db to return to the AC voltage source 1.

At this time, since the first winding 2a and the second winding 2b are magnetically coupled to form a coupled reactor, AC current ripple iac occurs in the first winding 2a and the second winding 2b, and current ripple obtained by adding DC current ripple idc and AC current ripple iac occurs in the coupled winding. In this example, the DC current ripple idc is smaller than AC current ripple iac, and therefore, if it is assumed that the DC current change amount in the coupled winding is 4 and the AC current change amount is 6, the current change amount in the coupled winding is the sum of these, i.e., 10.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 8.

In the state (b), the switching element Sb is OFF and the switching element Sd is OFF, and a current loop is formed in which current flows from the AC voltage source 1 through the third winding 2c, the first winding 2a, the switching element Sa, the link capacitor 4 for the load, and then the rectification element Db to return to the AC voltage source 1.

Since voltage change does not occur between the first winding 2a and the second winding 2b which are the coupled windings in the integrated magnetic part 2, the AC current ripple iac does not change, the excitation is reset by the output voltage of the link capacitor 4 and the AC voltage source 1, and only the DC current ripple idc in the first winding 2a decreases.

If it is assumed that the DC current change amount in the first winding 2a which is the coupled winding is −4 and the AC current change amount is 0, the current change amount in the coupled winding is the sum of these, i.e., −4.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −8.

In the state (c), the switching element Sb is OFF and the switching element Sd is ON, and a current loop is formed in which current flows from the AC voltage source 1 through the third winding 2c, the switching element Sd, and then the rectification element Db to return to the AC voltage source 1.

At this time, since the first winding 2a and the second winding 2b are magnetically coupled to form a coupled reactor, AC current change occurs in the first winding 2a and the second winding 2b. As a result, current obtained by adding the DC current ripple idc and the AC current ripple iac having a negative slope flows through the first winding 2a, so that the ripple current becomes smaller than in the mode of state (a).

If it is assumed that the DC current change amount in the first winding 2a which is the coupled winding is 4 and the AC current change amount is −6, the current change amount in the coupled winding is the sum of these, i.e., −2.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 8.

In the state (d), as in the state (b), the switching element Sb is OFF and the switching element Sd is OFF, and a current loop is formed in which current flows from the AC voltage source 1 through the third winding 2c, the first winding 2a, the switching element Sa, the link capacitor 4 for the load, and then the rectification element Db to return to the AC voltage source 1.

Since voltage change does not occur between the first winding 2a and the second winding 2b which are the coupled windings in the integrated magnetic part 2, the AC current ripple iac does not change, the excitation is reset by the output voltage of the link capacitor 4 and the AC voltage 1, and only the DC current ripple idc in the first winding 2a decreases.

If it is assumed that the DC current change amount in the first winding 2a which is the coupled winding is −4 and the AC current change amount is 0, the current change amount in the coupled winding is the sum of these, i.e., −4.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −8.

Among the above four modes, the period during which the current ripple in the coupled winding is maximum is the mode of state (a), in which the slope is, in this example, 10.

When the switching element Sb is ON, in the period of the state (a), the slope of current i1 of the first winding 2a which is the coupled winding is positive, and in the state (b), the state (c), and the state (d) which correspond to the remaining period in one cycle other than the above period, the slope of current i1 is negative. Thus, the current ripple frequency of the current i1 is equal to the switching frequency.

(2) Case of D>0.5

In the state (a), the switching element Sb is ON and the switching element Sd is ON, and a current loop is formed in which current flows from the AC voltage source 1 through the third winding 2c, the switching elements Sb, Sd, and then the rectification element Db to return to the AC voltage source 1.

At this time, a coupled reactor by magnetic coupling is not formed in the first winding 2a and the second winding 2b, there is no change in AC current ripple in the first winding 2a, and only the DC current ripple idc increases.

If it is assumed that the DC current change amount in the first winding 2a which is the coupled winding is 4 and the AC current change amount is 0, the current change amount in the coupled winding is the sum of these, i.e., 4.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 8.

In the state (b), the switching element Sb is ON and the switching element Sd is OFF, a coupled reactor by magnetic coupling is formed in the first winding 2a and the second winding 2b, so that the AC current ripple iac increases, and the DC current ripple idc in the first winding 2a attenuates because the excitation is reset.

If it is assumed that the DC current change amount in the first winding 2a which is the coupled winding is −4 and the AC current change amount is 6, the current change amount in the coupled winding is the sum of these, i.e., 2.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −8.

In the state (c), as in the state (a), a current loop is formed in which current flows from the AC voltage source 1 through the third winding 2c, the switching elements Sb, Sd, and then the rectification element Db to return to the AC voltage source 1.

At this time, a coupled reactor by magnetic coupling is not formed in the first winding 2a and the second winding 2b, there is no change in AC current ripple iac in the first winding 2a, and the DC current ripple idc increases.

If it is assumed that the DC current change amount in the first winding 2a which is the coupled winding is 4 and the AC current change amount is 0, the current change amount in the coupled winding is the sum of these, i.e., 4.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 8.

In the state (d), the switching element Sb is OFF and the switching element Sd is ON and a coupled reactor by magnetic coupling is formed in the first winding 2a and the second winding 2b. In the first winding 2a, the AC current ripple iac decreases, the DC current ripple idc also attenuates, and current ripple obtained by adding the AC current ripple iac and the DC current ripple idc occurs.

If it is assumed that the DC current change amount in the first winding 2a which is the coupled winding is −4 and the AC current change amount is −6, the current change amount in the coupled winding is the sum of these, i.e., −10.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −8.

Among the above four modes, the period during which the current ripple in the coupled winding is maximum is the mode of (d), in which the slope is, in this example, −10.

When the switching element Sb is ON, in the periods of the state (a), the state (b), and the state (c), the slope of current i1 of the first winding 2a which is the coupled winding is positive, and in the state (d) which corresponds to the remaining period in one cycle other than the above periods, the slope of current i1 is negative. Thus, the current ripple frequency of the current i1 is equal to the switching frequency.

Figure 7:
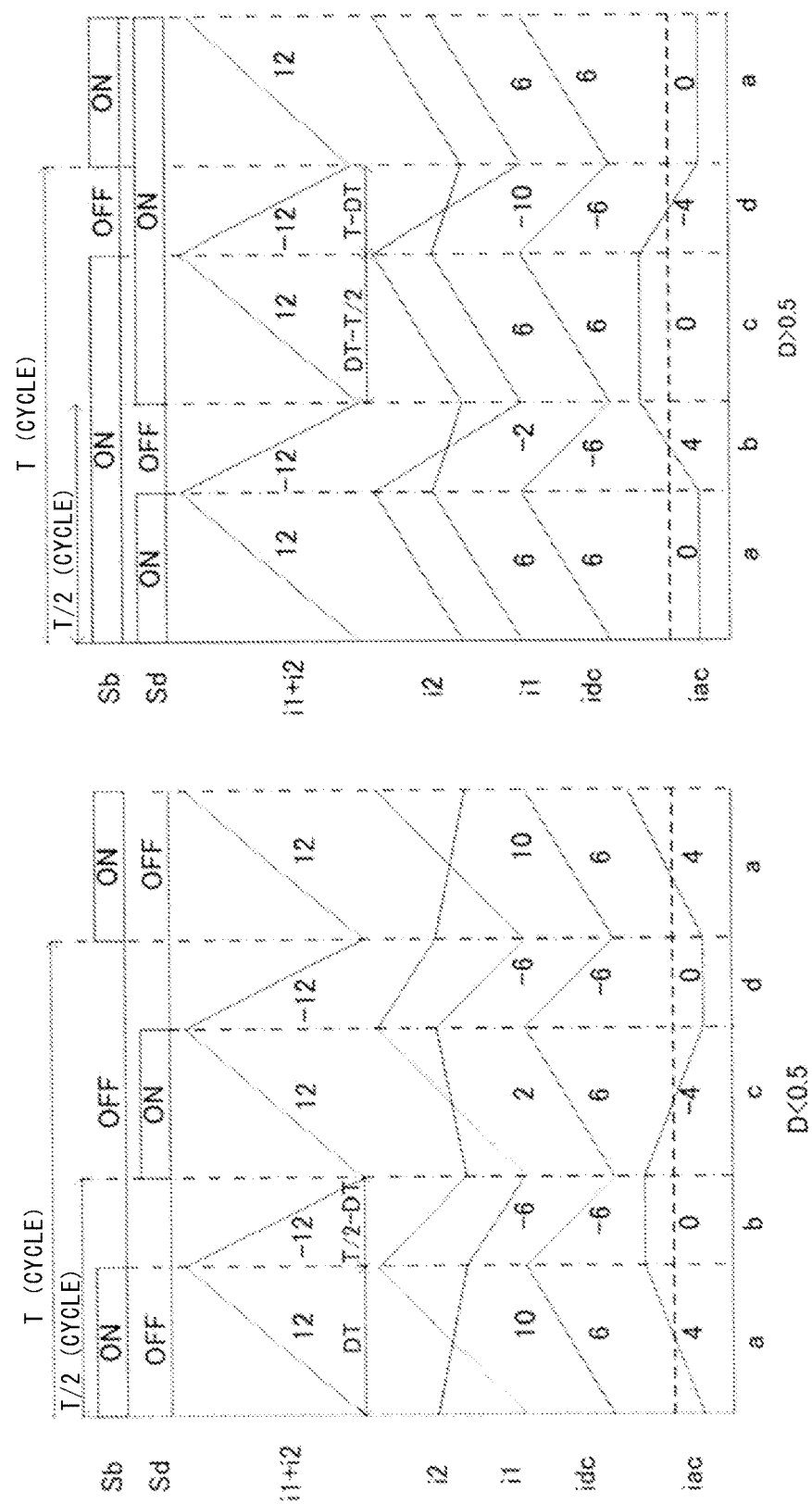
FIG. 7 schematically illustrates another example of occurrence of current ripple in the case of the negative current route.

Next, FIG. 7 schematically shows another example of occurrence of current ripple during driving of the switching elements. As in FIG. 6, FIG. 7 illustrates current i1 (current ripple) of the first winding 2a in the case of the negative current route shown in FIG. 3, while separating the current ripple into the DC current ripple idc and the AC current ripple iac.

A difference from FIG. 6 is that, in FIG. 6, the DC current ripple idc is smaller than the AC current ripple iac, and the current frequency of the coupled winding is equal to the switching frequency, whereas FIG. 7 shows an example in which the DC current ripple idc is greater than the AC current ripple iac, and shows that the current frequency of the coupled winding is two times the switching frequency.

The circuit operation is the same as in FIG. 6, and for each mode, the first winding 2a which is the coupled winding and the third winding 2c which is the DC winding will be described on the basis of the relationship between the DC current ripple idc and the AC current ripple iac.

Here, for facilitating the understanding, the current waveforms will be described under the assumption that the change amount of DC current ripple in the AC winding is 6 and the change amount of AC current ripple is 4.

(1) Case of D<0.5

In the state (a), the DC current change amount in the first winding 2a which is the coupled winding is 6, and the AC current change amount is 4. The current change amount in the coupled winding is the sum of these, i.e., 10.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 12.

In the state (b), the DC current change amount in the first winding 2a which is the coupled winding is −6, and the AC current change amount is 0. The current change amount in the coupled winding is the sum of these, i.e., −6.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −12.

In the state (c), the DC current change amount in the first winding 2a which is the coupled winding is 6, and the AC current change amount is −4. The current change amount in the coupled winding is the sum of these, i.e., 2.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 12.

In the state (d), the DC current change amount in the first winding 2a which is the coupled winding is −6, and the AC current change amount is 0. The current change amount in the coupled winding is the sum of these, i.e., −6.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −12.

When either the switching element Sb or the switching element Sd in the lower arms of the converter is ON, the slope of current of the first winding 2a which is the coupled winding is positive, and when both switching elements are OFF, the slope of the current is negative. Thus, the current ripple frequency is two times the switching frequency.

Among the four modes, the period during which the current ripple in the coupled winding is maximum is the mode of (a), in which the slope is, in this example, 10.

(2) Case of D>0.5

In the state (a), the DC current change amount in the first winding 2a which is the coupled winding is 6, and the AC current change amount is 0. The current change amount in the coupled winding is the sum of these, i.e., 6.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 12.

In the state (b), the DC current change amount in the first winding 2a which is the coupled winding is −6, and the AC current change amount is 2. The current change amount in the coupled winding is the sum of these, i.e., −2.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −12.

In the state (c), the DC current change amount in the first winding 2a which is the coupled winding is 6, and the AC current change amount is 0. The current change amount in the coupled winding is the sum of these, i.e., 6.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 12.

In the state (d), the DC current change amount in the first winding 2a which is the coupled winding is −6, and the AC current change amount is −4. The current change amount in the coupled winding is the sum of these, i.e., −10.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −12.

Among the four modes, the period during which the current ripple in the coupled winding is maximum is the mode of (d), in which the slope is, in this example, −10.

In the state (a) and the state (c) which are the periods during which the switching element Sb and the switching element Sd are both ON, the slope of current in the first winding 2a which is the coupled winding is positive, and in the periods during which only either one of the switching element Sb or the switching element Sd is ON, the slope of current is negative. Thus, the current ripple frequency is two times the switching frequency.

As described above, in comparison between FIG. 6 and FIG. 7, the current ripple in the first winding 2a which is the coupled winding is the same value of 10 in both of the condition where DC current ripple idc<AC current ripple iac is satisfied and the condition where DC current ripple idc>AC current ripple iac is satisfied. However, regarding the current ripple in the third winding 2c which is the DC winding, the value thereof is 8 when DC current ripple idc<AC current ripple iac is satisfied, whereas the value is 12 when DC current ripple idc>AC current ripple iac is satisfied. This indicates that, even if the current ripple in the coupled winding is the same, it is possible to reduce current ripple in the DC winding by satisfying the relationship of DC current ripple idc<AC current ripple iac. Thus, since the current ripple in the DC winding can be reduced, it is found that not only AC copper loss reduction in the DC winding but also capacitance reduction of input and output capacitors of the circuit and simplification of the filter can be achieved.

Next, the characteristics of the coupled winding and the DC winding in the case where the BH characteristic of the core material used for the integrated magnetic part 2 is nonlinear, i.e., the case where current ripples in the coupled winding and the DC winding change depending on the input current of the circuit, will be described with reference to FIG. 8.

Figure 8:
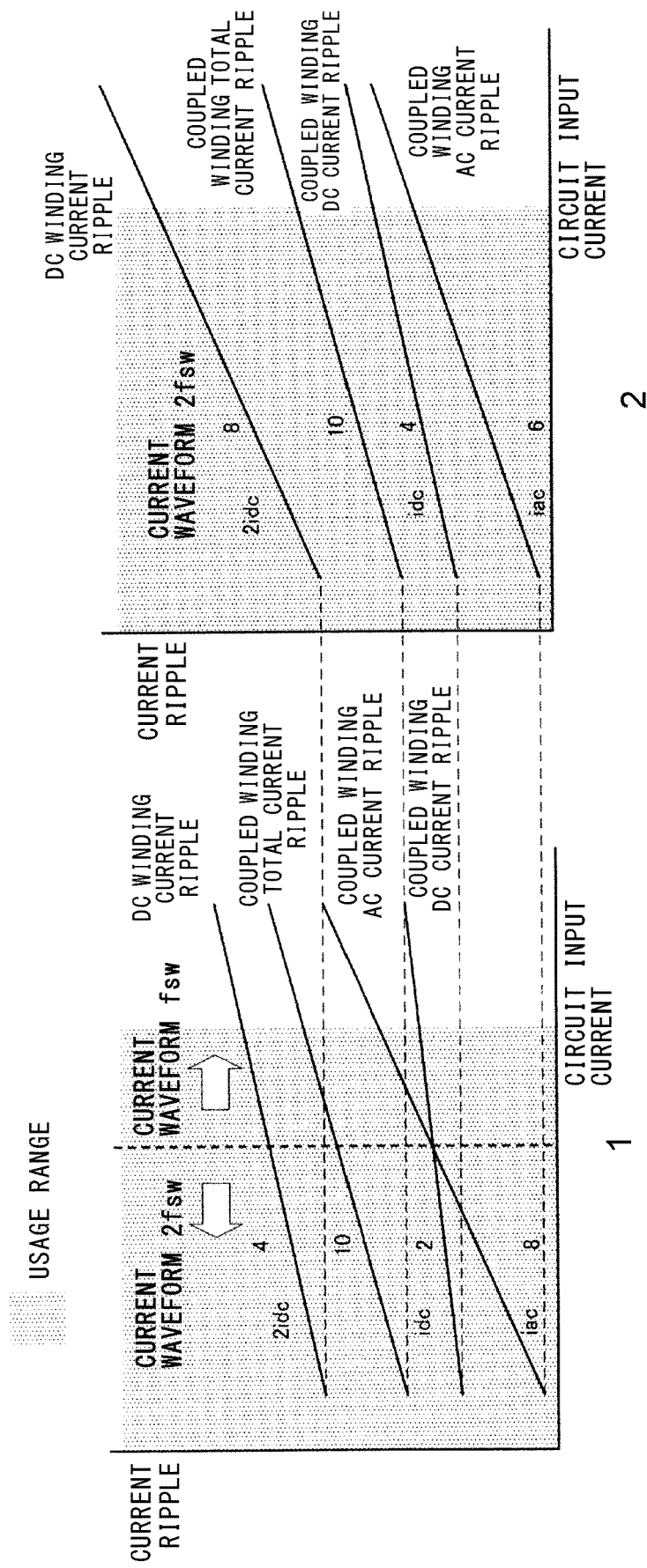
FIG. 8 illustrates the characteristics of a coupled winding and a DC winding.

FIG. 8(1) shows the case where the magnitude relationship between the DC current ripple idc and the AC current ripple iac in the coupled winding changes within the used current range, and FIG. 8(2) shows the case where the magnitude relationship between the DC current ripple idc and the AC current ripple iac in the coupled winding does not change within the used current range.

In both cases, the slope of the total current ripple in the coupled winding with respect to the input current of the circuit is set at the same value of 10.

As shown in FIG. 8(1), within the used current range, as the current increases, the magnitude relationship is inverted from DC current ripple idc<AC current ripple iac to DC current ripple idc>AC current ripple iac, whereby, even though the total current of the coupled winding is the same, the current waveform of the coupled winding becomes the same as the switching frequency when the current increases, and thus AC copper loss can be reduced.

In addition, with the above configuration, since the DC current ripple idc in the coupled winding can be suppressed relative to increase in the input current of the circuit, AC copper loss in the DC winding can be reduced.

The characteristics in the case of using the configuration in which the magnitude relationship between the DC current ripple idc and the AC current ripple iac in the coupled winding changes depending on the current of the circuit as described above will be summarized in Table 1.

TABLE 1

| Circuit current | Coupled winding Relationship of current ripples | Coupled winding Current frequency | DC winding Current ripple | DC winding AC copper loss |
|---|---|---|---|---|
| Small | idc > iac | fsw ※ × 2 | Suppress increase | Suppress increase |
| Great | idc < iac | fsw | | |

※ fsw: switching frequency of Sb, Sd

When the current of the circuit increases, increase in DC copper loss of the winding, increase in current ripple due to reduction in the permeability of the core material, and the accompanying increase in AC copper loss cannot be avoided, but in the case of large current, by using the characteristics in which the relationship of the current ripples in the coupled winding changes from DC current ripple idc>AC current ripple iac to DC current ripple idc<AC current ripple iac, the current frequency of the coupled winding decreases from 2fsw to fsw, whereby increase in AC copper loss of the coupled winding can be suppressed.

Since DC current that is two times the DC current of the coupled winding flows through the DC winding, there is a significant influence of increase in the DC copper loss in the case of large current. However, by using the characteristics in which the relationship of current ripples in the coupled winding changes from DC current ripple idc>AC current ripple iac to DC current ripple idc<AC current ripple iac, increase in AC copper loss of the DC winding is suppressed, and thus increase in loss of the windings can be suppressed.

Embodiment 2

Figure 9:
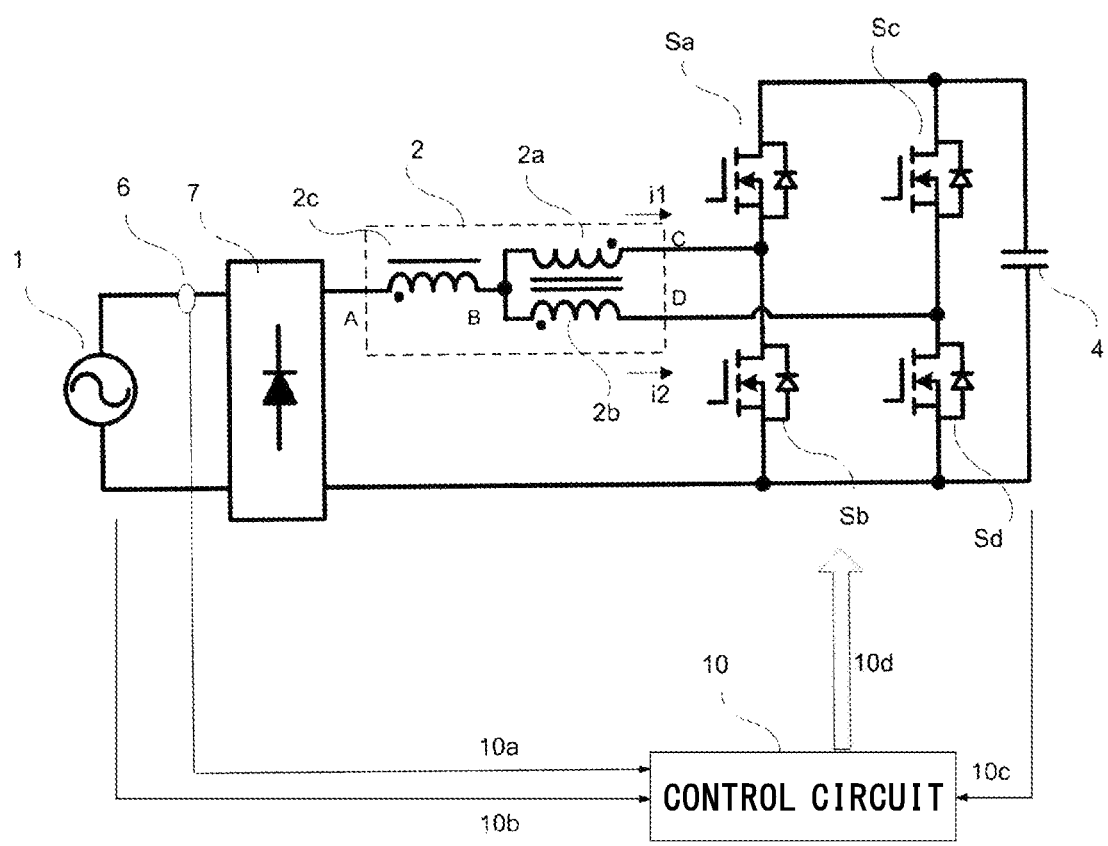
FIG. 9 is a circuit configuration diagram of a power conversion device according to embodiment 2 of the present invention.

FIG. 9 is a diagram showing the circuit configuration of a power converter according to embodiment 2 of the present invention.

This is a PFC converter of step-up type that rectifies AC voltage of the AC voltage source 1 by a bridge diode 7 and outputs the rectified DC voltage to the DC terminal. The positive terminal of the bridge diode 7 after rectification is connected to one end (point A) of the third winding 2c which is the winding of the DC reactor of the integrated magnetic part 2 formed by integrating the coupled reactor and the DC reactor as described in FIG. 1, and one-side ends of the first winding 2a and the second winding 2b which are the windings of the coupled reactor are connected to another end of the third winding 2c of the DC reactor (point B). The AC ends of the switching elements Sa, Sb, Sc, Sd composing the bridge-type converter circuit having upper and lower arms are respectively connected to another end of the first winding 2a and another end of the second winding 2b (point C, point D). The link capacitor 4 as a load is connected to the DC ends of the converter circuit. The negative terminal after rectification is connected to the negative DC end of the converter circuit and the negative terminal of the link capacitor 4.

Regarding the current ripple, the same description as that given in FIG. 6 and FIG. 7 in embodiment 1 applies, and the same effects are obtained. In this case, when the power transmission direction is a direction from the bridge diode 7 to the link capacitor 4, the switching elements Sb, Sd of the lower arms are controlled as in embodiment 1, and when the power transmission direction is a direction from the link capacitor 4 to the voltage source, the switching elements Sa, Sc of the upper arms are controlled in the same manner as in embodiment 1.

Embodiment 3

Figure 10:
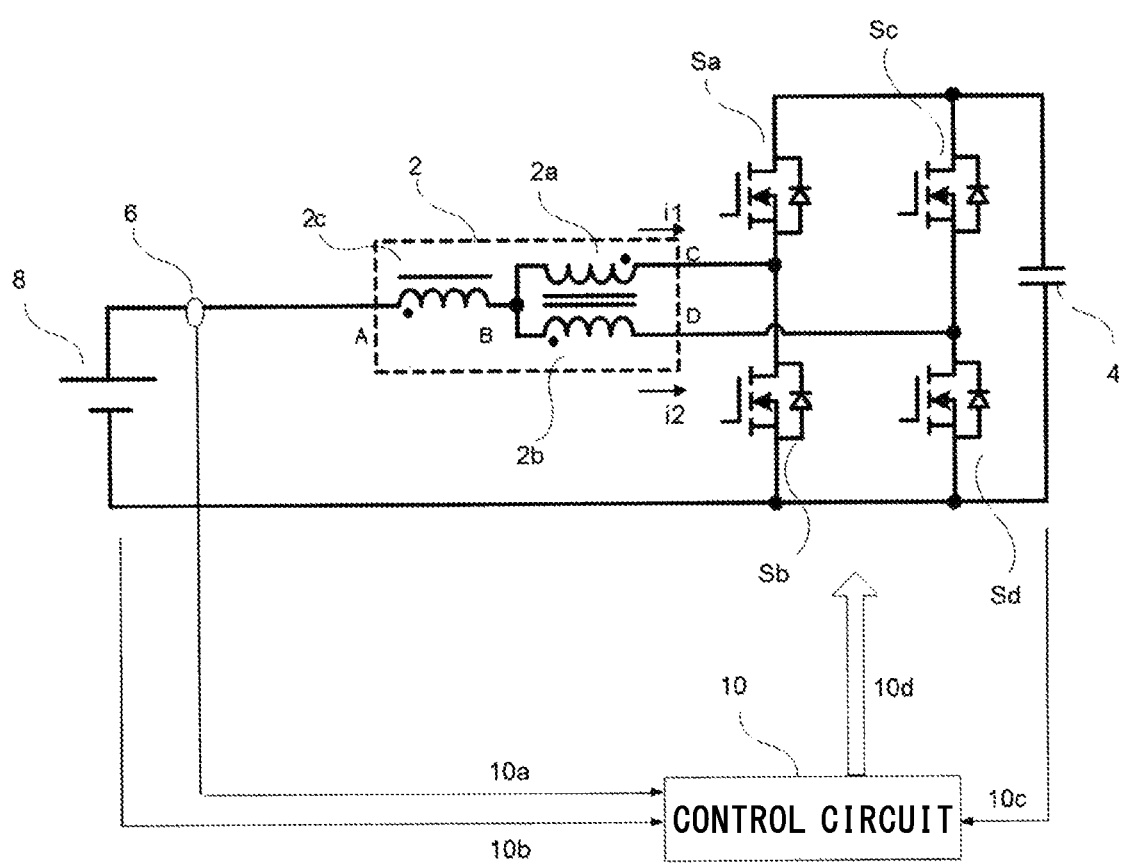
FIG. 10 is a circuit configuration diagram of a power conversion device according to embodiment 3 of the present invention.

FIG. 10 is a diagram showing the circuit configuration of a power converter according to embodiment 3 of the present invention.

This is a DC-DC converter that steps up DC voltage of the DC voltage source 8. The positive terminal of the DC voltage source 8 is connected to one end (point A) of the third winding 2c which is the winding of the DC reactor of the integrated magnetic part 2 formed by integrating the coupled reactor and the DC reactor, and one-side ends of the first winding 2a and the second winding 2b which are the windings of the coupled reactor are connected to another end of the third winding 2c of the DC reactor (point B). The AC ends of Sa, Sb, Sc, Sd of the bridge-type converter circuit having upper and lower arms are respectively connected to another end C of the first winding 2a and another end of the second winding 2b (point C, point D). The link capacitor 4 as a load is connected to the DC ends of the converter circuit. The negative terminal of the DC voltage source 1 is connected to the negative DC end of the converter circuit and the negative terminal of the link capacitor 4.

Regarding the current ripple, the same description as that given in FIG. 6 and FIG. 7 in embodiment 1 applies, and the same effects are obtained. In this case, when the power transmission direction is a direction from the DC voltage source 8 to the link capacitor 4, the switching elements Sb, Sd of the lower arms are controlled as in embodiment 1, and when the power transmission direction is a direction from the link capacitor 4 to the DC voltage source 8, the switching elements Sa, Sc of the upper arms are controlled in the same manner as in embodiment 1.

Embodiment 4

Figure 11:
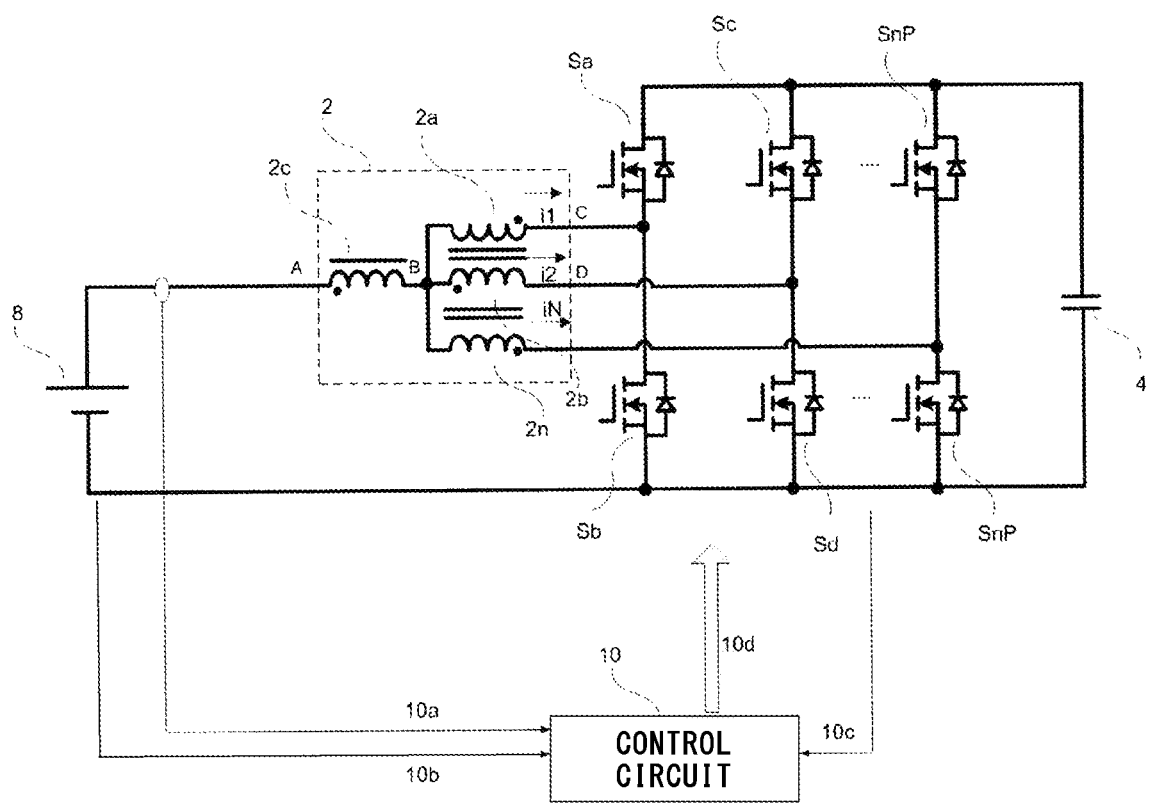
FIG. 11 is a circuit configuration diagram of a power conversion device according to embodiment 4 of the present invention.

FIG. 11 is a diagram showing the circuit configuration of a power converter according to embodiment 4 of the present invention.

Figure 12:
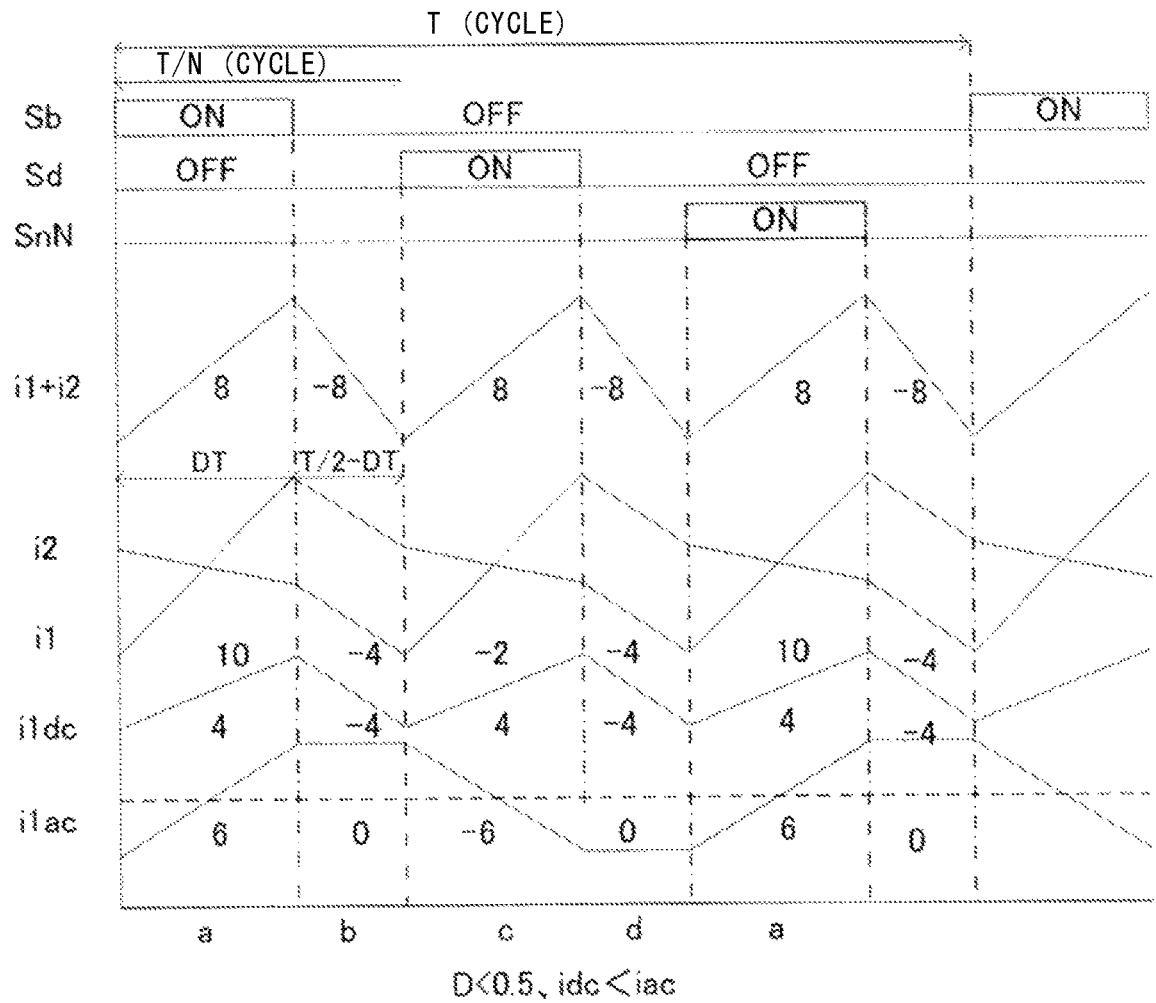
FIG. 12 is a schematic diagram of current ripple in the circuit configuration of the power conversion device according to embodiment 4 of the present invention.

This circuit configuration is obtained by modifying the DC-DC converter of embodiment 3 such that legs to be subjected to interleave driving are provided for N phases. FIG. 12 shows a schematic diagram of current ripple in this circuit configuration. Each leg is merely subjected to switching operation at a timing of 360/N degrees. Along with this, the frequency of the current ripple increases proportionally, and the ON time is shortened, whereby the value of the current ripple itself can be reduced. Thus, the capacitances of input/output capacitors can be reduced, and the current ripple frequency in the power supply and the load becomes N times the switching frequency, whereby the power supply filter can be downsized. Regarding the effect that the current ripple decreases, the same operation as that described in embodiment 1 applies, and the same effects are obtained.

It is noted that, within the scope of the present invention, the above embodiments may be freely combined with each other, or each of the above embodiments may be modified or simplified as appropriate.

In the drawings, the same reference characters denote parts having the same or equivalent configurations or functions.

DESCRIPTION OF THE REFERENCE CHARACTERS

1 AC voltage source
2 integrated magnetic part
2a first winding
2b second winding
2c third winding
2n n-th winding
2i first side leg
2j second side leg
2h center leg
3 converter circuit
Sa, Sb, Sc, Sd, SnP, SnN switching element
Da, Db rectification element
4 link capacitor
5 load
6 current sensor
7 bridge diode
8 DC voltage source
10 control circuit
10a input current information
10b input voltage information
10c DC output voltage information
10d drive signal

The invention claimed is:

1. A power conversion device comprising:
a reactor formed such that a DC winding and a plurality of coupled windings are wound around one magnetic body, one end of the DC winding is connected to a voltage source, one end of each of the plurality of coupled windings is connected to another end of the DC winding, another end of each of the plurality of coupled windings is connected to each intermediate connection point between a plurality of upper and lower arms composed of switching elements, and magnetic fluxes generated by currents flowing through the DC winding and the coupled windings merge with each other in the same direction; and
a control device for controlling the switching elements, wherein
the upper and lower arms arranged in parallel are caused to perform switching operation so as to be shifted by 180 degrees from each other, and switching of the upper arms or the lower arms is controlled in accordance with a magnitude of a duty of the switching operation and a magnitude relationship between DC current ripple and AC current ripple composing current ripple in the coupled windings.

2. The power conversion device according to claim 1, wherein
in a case where the duty of the switching operation is smaller than 0.5 and the DC current ripple composing the current ripple in the coupled windings is smaller than the AC current ripple,
in a half cycle of a switching cycle, a current polarity is controlled to be inverted such that, when the plurality of upper arms or the plurality of lower arms are complementarily turned on, a slope of the current ripple is positive, and when the plurality of upper arms or the plurality of lower arms are both turned off, a slope of the current ripple is negative, and
in the next half cycle, a current polarity is controlled to be the same such that, when the plurality of upper arms or the plurality of lower arms are complementarily turned on, a slope of the current is negative, and when the plurality of upper arms or the plurality of lower arms are both turned off, a slope of the current ripple is negative.

3. The power conversion device according to claim 1, wherein
in a case where the duty of the switching operation is greater than 0.5 and the DC current ripple composing the current ripple in the coupled windings is smaller than the AC current ripple, in a half cycle of a switching cycle, a current polarity is controlled to be the same such that, when the plurality of upper arms or the plurality of lower arms are both turned on, a slope of the current ripple is positive, and when the plurality of upper arms or the plurality of lower arms are complementarily turned on, a slope of the current ripple is positive, and in the next half cycle, a current polarity is controlled to be inverted such that, when the plurality of upper arms or the plurality of lower arms are both turned on, a slope of the current ripple is positive, and when the plurality of upper arms or the plurality of lower arms are complementarily turned on, a slope of the current ripple is negative.

4. The power conversion device according to claim 1, wherein in a case where the duty of the switching operation is smaller than 0.5 and the DC current ripple composing the current ripple in the coupled windings is greater than the AC current ripple, in a half cycle of a switching cycle, a current polarity is controlled to be inverted such that, when the plurality of upper arms or the plurality of lower arms are complementarily turned on, a slope of the current ripple is positive, and when the plurality of upper arms or the plurality of lower arms are both turned off, a slope of the current ripple is negative, and in the next half cycle, a current polarity is controlled to be inverted such that, when the plurality of upper arms or the plurality of lower arms are complementarily turned on, a slope of the current ripple is positive, and when the plurality of upper arms or the plurality of lower arms are both turned off, a slope of the current ripple is negative.

5. The power conversion device according to claim 1, wherein in a case where the duty of the switching operation is greater than 0.5 and the DC current ripple composing the current ripple in the coupled windings is greater than the AC current ripple, in a half cycle of a switching cycle, a current polarity is controlled to be inverted such that, when the plurality of upper arms or the plurality of lower arms are both turned on, a slope of the current ripple is positive, and when the plurality of upper arms or the plurality of lower arms are complementarily turned on, a slope of the current ripple is negative, and in the next half cycle, a current polarity is controlled to be inverted such that, when the plurality of upper arms or the plurality of lower arms are both turned on, a slope of the current ripple is positive, and when the plurality of upper arms or the plurality of lower arms are complementarily turned on, a slope of the current ripple is negative.

6. The power conversion device according to claim 1, wherein a magnitude relationship between the DC current ripple and the AC current ripple changes in accordance with current of the voltage source.

7. The power conversion device according to claim 6, wherein when current of the voltage source is smaller than a reference value, the DC current ripple is greater than the AC current ripple, and when current of the voltage source is greater than the reference value, the AC current ripple is greater than the DC current ripple.

8. The power conversion device according to claim 1, wherein the voltage source is an AC voltage source, one end of the AC voltage source is connected to the DC winding, and another end thereof is connected to a rectification element connected in parallel with the plurality of upper and lower arms composed of the switching elements.

9. The power conversion device according to claim 1, wherein the voltage source is a DC voltage source.

10. The power conversion device according to claim 9, wherein the DC voltage source is composed of an AC power supply and a rectification element.

11. The power conversion device according to claim 1, wherein the one magnetic body has a core shape that includes three legs, a gap is provided to a center leg thereof, the DC winding is wound around the center leg, and the coupled windings are wound around two side legs thereof located on both sides of the center leg.

12. The power conversion device according to claim 1, wherein switching legs to be subjected to interleaving are provided for N phases, and the switching elements are each operated at a timing of 360/N degrees.

13. The power conversion device according to claim 1, wherein a frequency of the current ripple is N times a switching frequency.

\* \* \* \* \*